Figure 1:
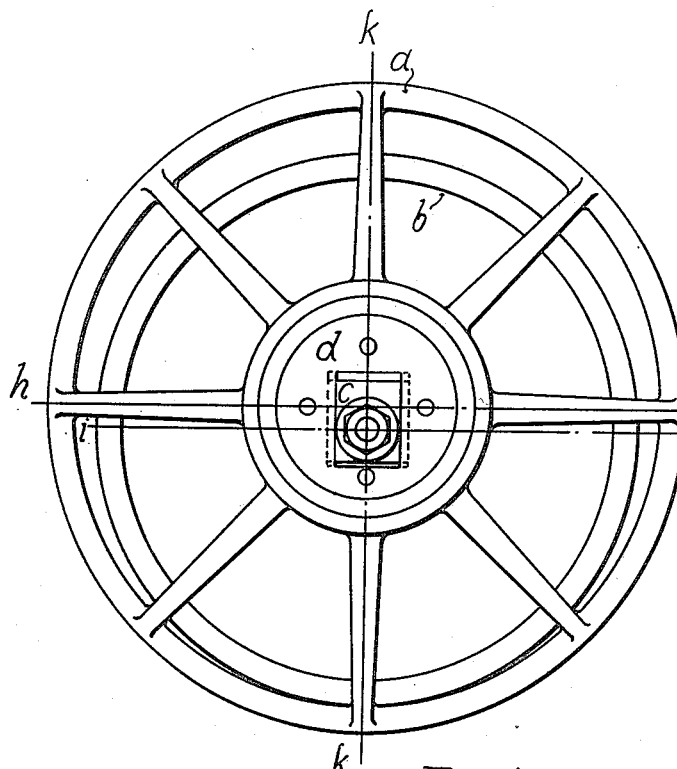
Figure 2:
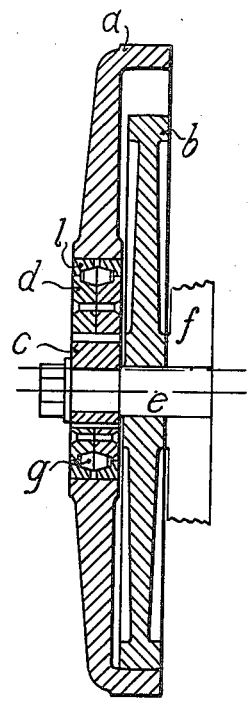
Figure 3:
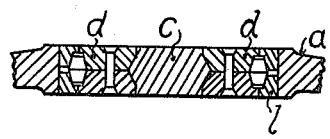

A. H. MILLER.
VEHICLE WHEEL.
APPLICATION FILED APR. 17, 1912.

1,075,664.

Patented Oct. 14, 1913.

WITNESSES:

INVENTOR.
Axel Herman Miller

UNITED STATES PATENT OFFICE.

AXEL HERMAN MILLER, OF CHICAGO, ILLINOIS.

VEHICLE-WHEEL.

1,075,664.   Specification of Letters Patent.   Patented Oct. 14, 1913.

Application filed April 17, 1912. Serial No. 691,489.

*To all whom it may concern:*

Be it known that I, AXEL HERMAN MILLER, a citizen of the United States, residing at 1843 West Park avenue, in the city of Chicago, in the county of Cook and State of Illinois, have invented a new and useful Vehicle-Wheel, of which the following is a specification.

My invention relates to a compound wheel in which the inner wheel runs on the inside of the rim of the outer wheel and is for use on locomotives, automobiles and motor trucks, bicycles, motorcycles, street cars, traction engines or any vehicle on which the power is applied through the axle or on the wheel.

The objects of my invention are; first, to increase the power and tractive force of the vehicle; second, to eliminate track hammer; third, to facilitate the starting and stopping of the vehicle. I attain these objects by a mechanism illustrated in the accompanying drawing in which—

Figure "1" is an elevation of the wheel; Fig. "2" is a section through the vertical center line; and Fig. "3" is a section on the horizontal center line "$h$—$h$."

Similar letters refer to similar parts throughout the several views.

As shown in said drawings the compound wheel comprises an outer wheel $a$, and a smaller, inner wheel $b$, which latter lies in the vertical plane of the inwardly flanged rim of the outer wheel and at its bottom rests upon such rim. The inner wheel $b$ is fixed to a drive shaft $e$ through which the power of the vehicle is transmitted to such wheel. The shaft is shown as journaled in a part $f$, which latter indicates, diagrammatically merely, the frame of the vehicle supported upon the shaft. The weight of the vehicle is thus carried through the shaft or axle $e$ upon the inner wheel $b$, which rests upon the lower part of the rim of the outer wheel $a$. It will be seen therefore that it is not necessary that any of the weight of the vehicle be carried upon the hub of the wheel $a$, and therefore no provision is made to carry such weight, but means are provided for maintaining the two wheels in their proper relative position with the inner one lying in the plane of the in-turned flanged rim of the outer one. For this purpose the end of the shaft or axle $e$ is reduced in diameter and extends through an opening in a rectangular bearing block $c$, in which it is rotatively fixed by means of a washer and nut on the end of the axle in the same manner as wheels are commonly secured on the ends of wagon axles. The rectangular bearing block $c$ fits into a corresponding rectangular opening eccentrically arranged in a circular disk $d$ upon which the outer wheel $a$ is mounted. As it is necessary to secure the parts against side thrust, the rectangular opening in the disk $d$ is made with its vertical sides undercut and the block $c$ is correspondingly shaped to fit into such opening; and for the purpose of assembling the parts the disk $d$ is made in two parts separated in a radial plane and secured together by bolts or rivets as indicated. The rectangular opening in the disk $d$ is also made somewhat longer than the height of the bearing block $c$ in order to permit the two wheels to separate at their contact surfaces and allow for unevenness and irregularities in their running. The wheel $a$ is mounted upon the disk $d$ with the interposition of rollers $g$; and with the like purpose of providing against side thrust these rollers are made in the form of double cones running in V-shaped grooves in the periphery of the disk $d$ and in the inner circumference of an annular ring $l$ which is fixed in the circular opening through the hub of the wheel $a$.

From the foregoing it will be seen that when the wheel $a$ rests on the ground it carries the load of the vehicle directly upon the lower part of its rim through the wheel $b$ which runs on such rim, and that since the rectangular opening through the disk $d$ is made longer than the height of the bearing block $c$, none of the weight of the vehicle is carried through the hub of the wheel $a$, but that the other parts of the device, including the bearing block $c$ with the nut and washer fixing it on the end of the axle, the disk $d$, and the roller bearing, are provided merely for the purpose of providing against side thrust and keeping the two wheels in their proper parallel relation to each other.

In the operation of the device power is applied through the axle to the inner member $b$, and as such member $b$ runs on the inside of the rim of the outer wheel $a$ it tends to run ahead of the vertical center line of the latter, which line is indicated at $k$, $k$, and it also tends to climb up on the rim of the outer wheel. Since the only connection between the two wheels is through the hub parts above described such relative change of position of the two wheels is permitted; it being noted that the disk d is free to rotate about the axle e which is journaled in the bearing block c, and the wheel a is free to rotate about the disk d. Since the wheel b is free to rotate it is obviously free to roll up the curved rim of the wheel a provided it can advance forward; and to permit it to advance forward it is only necessary for the eccentric disk d to rotate about its axis e and allow its shortest radius to be inclined instead of vertical as shown. This can be illustrated by rotating the drawing Fig. 1 so that the line k, k, is inclined instead of vertical to show how the wheel would appear if the wheel a rested on the ground at a point either ahead of or behind the bottom point k. Since all parts of the wheel a are symmetrical about its center this will furnish an exact illustration of the appearance of the device with the inner member b rolled partly up the rim of the outer member a. It will therefore be seen that if sufficient external resistance is encountered to prevent the wheel a from rotating, such as a rock or other obstruction in its path, the wheel b will actually roll up the curved path upon which it runs, until the shifting of its weight to a point on the rim of the wheel a farther forward and the correspondingly greater leverage thereby exerted, added to the rotative force exerted upon the outer wheel by the frictional engagement between the two wheels, will overcome the obstacle; or until it has reached such height that its frictional engagement with the rim of the wheel a is not sufficient to keep it from slipping. It should be noted therefore that although the rotative force exerted upon the outer wheel by the frictional engagement of the inner wheel would constitute the principal part of the tractive force of the apparatus if the wheel a ran upon a perfectly smooth track without obstacles or obstructions of any sort, in case of obstructions or unusual resistance encountered this frictional tractive force is supplemented by the shifting of the weight of the inner wheel and the correspondingly increased leverage or rotative moment imparted to the wheel a, with the result that the obstacle is absorbed gradually, or the resistance is distributed, as in the ordinary case of a wheel rolling up an incline. This would ordinarily occur upon starting the vehicle where a force of acceleration is required; and conversely, in stopping the vehicle, if the inner wheel b is retarded, as by the ordinary braking operation, the wheel a would run ahead and permit the inner wheel to climb backward up the curved lower part of its rim and exert an opposite leverage to retard the vehicle.

I claim as my invention:

1. In a wheel, the combination with an inner member and a shaft to which it is fixed, of an outer member with an annular rim carrying the weight of said inner member, a circular disk in the center of such outer member, and a bearing block for such shaft eccentrically arranged in such disk.

2. In a wheel, the combination of an outer member with an annular rim, a circular disk on which said outer member is mounted, a parallel-sided opening in such disk, a bearing block in such opening, a shaft journaled in such bearing block, and an inner member fixed to such shaft and resting on the rim of such outer member.

3. In a wheel, the combination of an outer member with an annular rim, a circular disk on which said outer member is journaled, a parallel-sided opening in such disk, a bearing block in such opening, engaging its parallel sides and free to slide in such opening, a shaft with its end journaled in such bearing block, and an inner member fixed to such shaft and resting on the rim of such outer member.

4. In a wheel, the combination of an outer member with an annular rim, a circular disk on which said outer member is journaled, a parallel-sided opening in such disk, a bearing block in such opening having limited vertical movement therein, a shaft journaled in such bearing block, and an inner member fixed to such shaft and resting on the rim of such outer member.

5. In a wheel, the combination of an outer member with an annular rim, a circular disk on which said outer member is journaled, an anti-friction bearing between such parts, a parallel-sided opening in such disk, a bearing block in such opening, a shaft journaled in such bearing block, and an inner member fixed to such shaft and resting on the rim of such outer member.

AXEL HERMAN MILLER. [L. S.]

Witnesses:
E. J. ALLMAN,
W. A. RITTER.